(No Model.) 2 Sheets—Sheet 1.

D. C. B. GRIFFITH.
SCALE WEIGHING MACHINE.

No. 589,081. Patented Aug. 31, 1897.

Witnesses
H. van Oldenneel
E. A. Scott

Inventor
David Charles Ballinger Griffith
by Richards
Attorneys (No Model.) 2 Sheets—Sheet 2.

D. C. B. GRIFFITH.
SCALE WEIGHING MACHINE.

No. 589,081. Patented Aug. 31, 1897.

Witnesses
Ho. van Oldenneel
E. A. Scott

Inventor
David Charles Ballinger Griffith by Richards
Attorneys

UNITED STATES PATENT OFFICE.

DAVID CHARLES BALLINGER GRIFFITH, OF BEDFORD, ENGLAND.

SCALE WEIGHING-MACHINE.

SPECIFICATION forming part of Letters Patent No. 589,081, dated August 31, 1897.

Application filed May 15, 1896. Serial No. 591,693. (No model.)

*To all whom it may concern:*

Be it known that I, DAVID CHARLES BALLINGER GRIFFITH, residing at Bedford, England, have invented a new or Improved Scale Weighing-Machine for Delivering Predetermined Quantities of Substances from Bulk, of which the following is a specification.

This invention relates to scale weighing-machines for weighing and delivering predetermined and desired amounts of substance from bulk—such as tea, sugar, grain, or other material that is capable of being fed through a controllable orifice—and has for its object the provision of means whereby the above functions are obtained with great accuracy, and when necessary the operation of the machine may be automatically maintained by the force of gravity through the falling of the material in the process of weighing and delivering in predetermined quantities.

This invention consists, first, in the means by which the weighing is effected by two weighing devices, and, secondly, in the means by which the automatic action of the apparatus is effected.

In order that the invention may be the better understood, I will now proceed to describe it in relation to the drawings hereunto annexed, reference being had to the letters and figures marked thereon.

Like letters refer to like parts in the various figures.

Figures 1, 2:
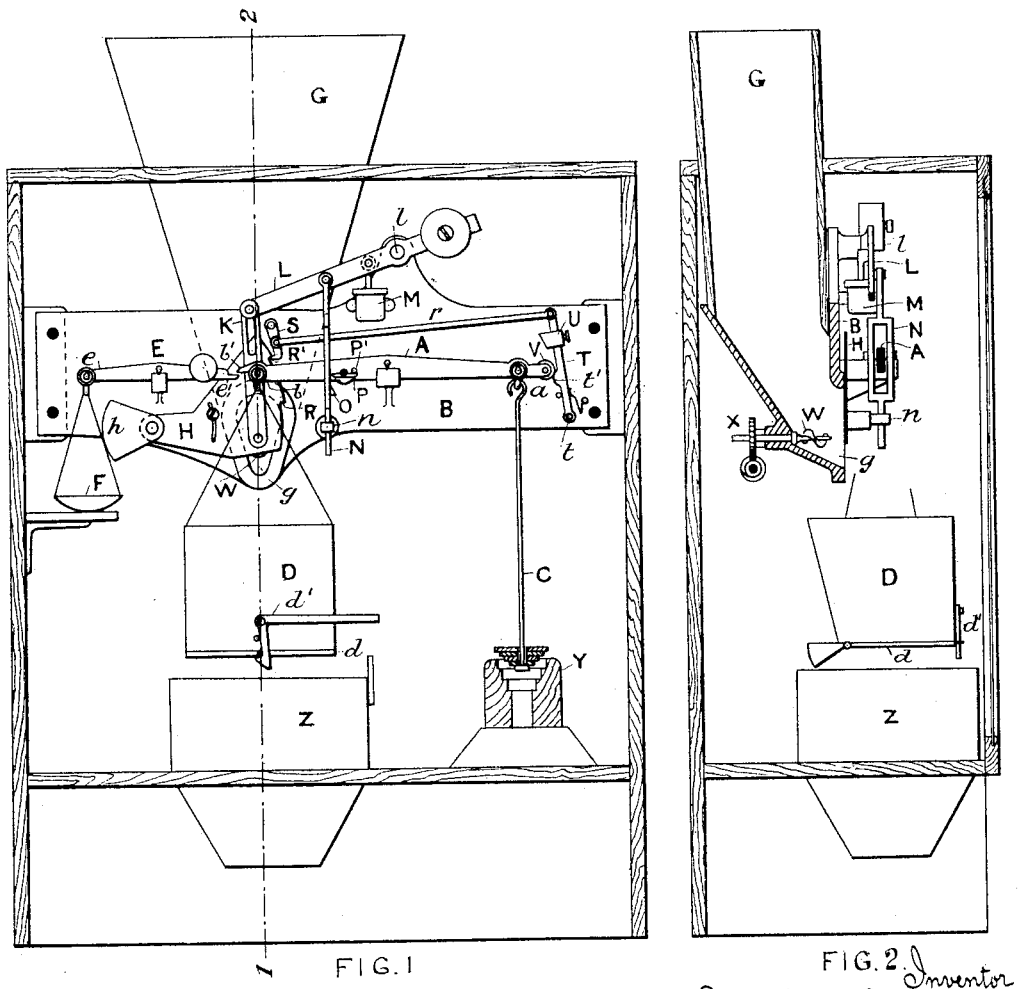
Figure 3:
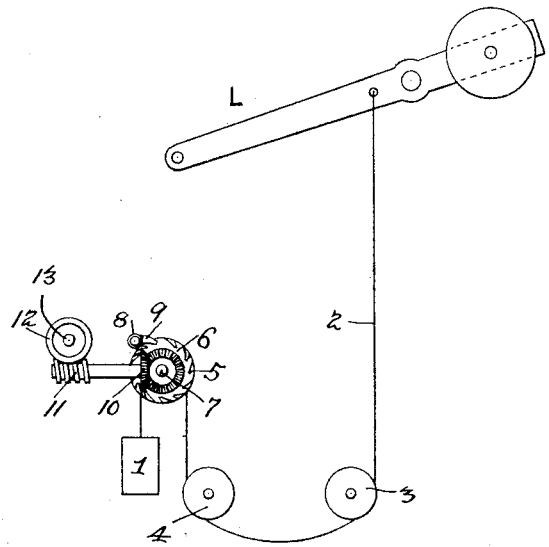
Figure 5:
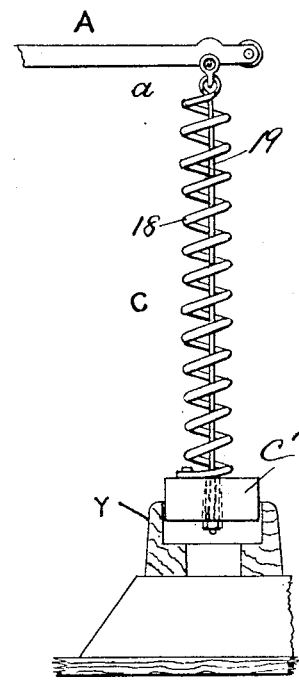
Figure 4:
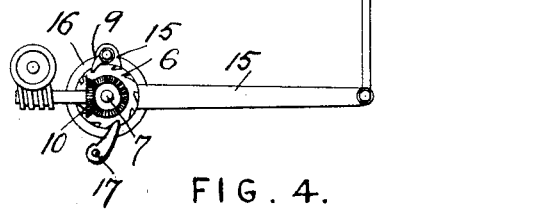

Figure 1 is a front elevation of an automatic weighing-machine according to my invention. Fig. 2 is a part sectional view on the line 1 2, Fig. 1. Figs. 3 and 4 show means by which the energy of the falling weight may be utilized on the return stroke of the scale-beam. Fig. 5 shows a modified means whereby the motion of the beam A is rendered gradual and steady.

To carry my invention into effect, I mount the main beam A upon a supporting-plate or other device B. At the end $a$ of the beam A I hang a device C, carrying a portion of the weight, which is used as the counterbalancing standard of weight. Upon the other end $b$ of the beam A, I hang the hopper D, which is fitted with a counterbalanced hinged bottom $d$, the latter being maintained in the closed position by a catch or detent $d'$. Upon the support B, I also arrange a second beam E, at the end $e$ of which I hang a device F to carry the remaining portion of the weight, which is used as the counterbalancing standard of weight.

The end $e'$ of the beam E is adapted to engage with a part $b'$ on the end $b$ of the main beam A when the two beams are at approximately the horizontal position, but when the beams have moved through an angle away from the horizontal position the main beam A trips past the secondary beam E.

At the back of the support B, I arrange a hopper G, into which the material to be weighed is placed.

An orifice $g$ is arranged in the support B, leading from the hopper G, which is provided with a hinged door H, preferably arranged with a counterbalance $h$. This door H is connected by a slotted link K to a lever L, pivoted on the pin $l$, supported on the plate B. This lever L is provided with a counterbalance-weight to more or less counterbalance the end of the lever to which the door H is connected. A dash-pot M is arranged on the support B and is adapted to control the movement of the lever L and the other moving parts of the device. A frame-connecting rod N is pivoted at its upper end to the lever L and is adapted at its lower end to slidingly engage in a guide $n$. This connecting-rod N has one or two projections O, which are adapted to engage on the upstroke of the device with pivoted fingers P, carried by the main beam A. The fingers P are restrained from turning in one direction by a pin or stop P'. When, however, the beam is moving in a downward direction the fingers P trip under the projections O, so that the beam A on its return upward stroke tends to lift the connecting-rod, and as the mechanism reaches its upper position the fingers P slide away from the projections O and become disengaged therefrom for the reason that the projections and fingers are moving in arcs away from one another.

The door H is provided with two or more notches R R' to control the flow of the material from the orifice $g$, first with a coarse and afterward with a fine feed, in order to obtain accuracy of weight. The door H is maintained in these positions by a detent S, adapted to engage in the notches R R'. This detent is connected by a rod $r$ to a lever T, pivoted at $t$ on the support B. This lever T has a raised portion $t'$ and an adjustable part U, which are adapted to engage with a wheel V, mounted on the end $a$ of the main beam A. The portion $t'$ is arranged so that when the wheel V moves the lever T to the right the detent S is withdrawn from the notch R and the door H falls from the position of coarse feed to that of fine feed, when it is retained by the detent S engaging the notch R'. When the wheel V comes in contact with the part U, the detent S again moves and allows the door H to close the orifice $g$.

At the mouth of the orifice $g$, or in any other convenient position, a stirring or agitating device or devices W are arranged to keep the material in motion, especially during the fine feed. This device W may be operated by any suitable mechanism X, which may be driven by spring or weight or by other suitable source of energy. In the case of a weight or a spring the upward movement of the beam A may be utilized to lift the weight or wind up the spring, and thus utilize the energy of the falling weight carried by the device C on the return stroke of the main beam A after the discharge of the hopper D.

In the case of a weight-actuated agitating mechanism, as shown in Fig. 3, I effect the raising of the weight 1 by connecting it to the lever L by a cord 2. This cord passes round pulleys 3 and 4 and round a chain-wheel 5 similar to that which is used in a Dutch clock. Upon this chain-wheel 5 a ratchet-wheel 6 is fixed, and both these wheels are loosely mounted on the shaft 7. An arm 8 is fixedly attached to the shaft 7 and carries a pawl 9, adapted to engage with the ratchet-wheel 6. The shaft 7 is geared by a bevel-gearing 10 to the worm 11, which gears into a worm-wheel 12, mounted on the shaft 13, which carries the agitator W. When the lever L is lifted on the upstroke of the machine, the weight 1 is pulled up and is retained in the upper position by the pawl 9 engaging with the ratchet-wheel 6, and as the lever L drops the cord 2 hangs quite slack and allows the weight 1 to operate the agitating device W.

In the case of the spring-actuated device, as shown in Fig. 4, I connect the lever L by a connecting-rod 14 with the lever 15, pivoted about the shaft 7. This lever carries a pawl 9, which is adapted to engage with a ratchet-wheel 6. About the shaft 7, at the back of the lever 15, is arranged a spring-barrel 16, containing a spring, one end of which is attached to the ratchet-wheel 6 and the other end is attached to the shaft 7, which is geared by the bevel-gearing 10 to the agitating device, as hereinbefore described.

A pawl 17, mounted upon a fixed support of the framing of the machine, prevents the backward movement of the ratchet-wheel 6 after it has been moved round by the upward movement of the lever L to reinforce the spring in the barrel 16.

As it is desirable that the motion of the beam A shall be as steady and gradual as possible, I prefer to take up the main counterbalancing-weights gradually. This can be effected by having a step-support Y, as shown in Fig. 1, and adapting the weights so that they rest upon the various steps and are picked up one by one as the beam A moves. This function may also be effected by inserting a spring between the end $a$ of the beam A and the counterbalancing-weight carried by C—in other words, by depending C from the beam A by a spring. This is illustrated in Fig. 5, from which it will be seen that the spring 18 is hung at one end to the beam A and is attached at the other end to the weight $c'$. A rod 19 is also hung on the beam A and passes down through a clearing-hole in the weight to the under side thereof, a nut being screwed upon the rod so as to allow the weight to rest thereon. When now the hopper D is empty and in the upper position, the weight rests upon the support Y, and as the hopper is filled the spring gradually extends and takes up the weight of the device C in a similar but more gradual manner than is done by the series of weights and stops, as hereinbefore described, until the whole weight is freely suspended, when it is supported by the rod 19. The rod 19 passes loosely through the weight while the spring is attached to said weight.

Beneath the hopper D, I arrange a chute or receptacle Z, into which the hopper D discharges. The lever of the retaining-catch $d'$ is adapted to come into contact with the side of the chute Z or other convenient device on the downward stroke in order to release the door $d$ and allow the superincumbent weight of material in the hopper D to open the door $d$ and deliver itself into the chute Z.

The operation of my machine is as follows: It is assumed, for example, that one pound of material is to be weighed at each operation, in which case the counterbalancing-weights may be divided by putting thirteen and one-half ounces on the device C of the main beam A and two and one-half ounces in the scale-pan F of the secondary beam E. We will suppose that a quantity has just been weighed and delivered and that the hopper D is in its lowest position. The door H is of course closed and the secondary beam E is horizontal. It will now be seen that the ends of the pivoted fingers P have tripped below the projections O and that the thirteen and one-half ounces in the device C lift the hopper D and connecting-rod N, and with it the lever L, link K, and door H. As the beam A reaches its upper position the door is held by the detent S and the fingers P trip past the projections O, which allows the connecting-rod N, lever L, and link K to return to the lower position again. The door $d$ of the hopper D has been fastened automatically by the catch $d'$ immediately the lever of the catch was free. The material now pours into the hopper D from the orifice $g$, and as the weight increases in the hopper D the beam A moves until the wheel V engages the projection t' on the lever T, withdraws the detent S from the notch R, and releases the door H to the position of fine feed. The beam A now settles down on the secondary lever E, the wheel V being now quite free from the projection t' and the beam A is entirely unrestrained except by the weighing-weight and the material being weighed. Immediately the proper quantity has been allowed to fall into the hopper the two beams A and E move downward and the wheel V comes into contact with the projection U on the lever T, which disengages the detents from the notch R' of the door H, allowing the latter to close. When the beams have moved through a small arc, the part b' of the main beam A trips past the end e' of the secondary beam E, allowing the latter to return to normal position and the main beam A, when thus relieved of two and one-half ounces of support, to continue its downward movement until the lever of the catch d' comes into contact with the chute Z, allowing the door d to open and the material to discharge into the chute Z. It will also be noticed that the fingers P have tripped over the projections O and have engaged themselves on the underneath side thereof, ready to operate the mechanism into the weighing position again. The stirring or agitating device W is moving all the time under the influence of the spring, weight, or other motor mechanism, which may be reinforced at every cycle by the movement of the lever L or other convenient and equivalent mechanism on the return stroke of the unbalanced thirteen and one-half ounces. The dash-pot M allows the motion of the device to be effected without any jerk or vibration. The part b' of the main beam A trips by the secondary beam E on its upstroke, and thus is in position to engage the beam E on the downstroke of the device.

Having now described my invention, what I claim, and desire to secure by Letters Patent, is—

1. A machine for automatically delivering predetermined quantities of weighted material consisting of a main beam and a secondary beam adapted to engage with one another and to trip by one another when the approximate balanced position of the beam is reached, each carrying a portion of the counterbalancing standard of weight, a receptacle containing the material to be weighed, having an orifice controllable by a door, a retaining device controlling the door, means for operating the retaining device by the movement of the main beam, and a hopper with an automatic discharging-door, carried by the main beam.

2. In an automatic weighing-machine in combination, a main beam, a secondary beam each carrying a portion of the counterbalancing standard of weight, adapted to first engage with one another before the full weight of material is obtained and to trip past one another after the full proper weight of material has been obtained and the beam has reached an approximately balanced position, a hopper or receptacle provided with a controllable orifice, a device operated by the main beam controlling said orifice before and after the critical period of movement of the beam, and a hopper carried by the main beam having a counterbalanced hinged bottom and a retaining-catch released by the movement of the device substantially as described.

3. In an automatic weighing-machine in combination, a main beam carrying a portion of the counterbalancing standard of weight, a secondary beam carrying the remaining portion of the said weight, the main beam being adapted to engage with the secondary beam during the period of weighing and to trip past same after the weighing has been effected and the beam has reached an approximately balanced position, a device controlling the delivery of the material from bulk, means operated by the main beam for controlling the delivering device during the non-critical period of operation of the main beam, a hopper carried by the main beam adapted to deliver the material automatically after being weighed, means connected with the main beam for effecting the return motion of the weighing device and opening of the controllable feeding device and an agitating device to maintain the delivery of the material from bulk.

4. In combination in an automatic weighing-machine, the main beam, a hopper, an agitating device therein, the said main beam being counterbalanced, the motor mechanism, the agitating device and means for utilizing the energy of the falling counterbalance of the main beam to reinforce the motor mechanism of the agitating device, substantially as described.

In testimony whereof I have signed my name to this specification in the presence of two subscribing witnesses.

DAVID CHARLES BALLINGER GRIFFITH.

Witnesses:
REGINALD WILLIAM JAMES,
RICHARD A. HOFFMANN.